(12) United States Patent
Mongillo et al.

(10) Patent No.: US 10,012,092 B2
(45) Date of Patent: Jul. 3, 2018

(54) LOW TURN LOSS BAFFLE FLOW DIVERTER

(71) Applicant: United Technologies Corporation, Hartford, CT (US)

(72) Inventors: Dominic J. Mongillo, West Hartford, CT (US); Brandon W. Spangler, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 263 days.

(21) Appl. No.: 14/824,195

(22) Filed: Aug. 12, 2015

(65) Prior Publication Data
US 2017/0044906 A1 Feb. 16, 2017

(51) Int. Cl.
| | |
|---|---|
| F01D 5/18 | (2006.01) |
| F01D 5/14 | (2006.01) |
| F01D 9/04 | (2006.01) |
| F01D 25/12 | (2006.01) |
| F16L 53/00 | (2018.01) |

(52) U.S. Cl.
CPC .............. *F01D 5/187* (2013.01); *F01D 5/147* (2013.01); *F01D 5/188* (2013.01); *F01D 5/189* (2013.01); *F01D 9/041* (2013.01); *F01D 25/12* (2013.01); *F16L 53/00* (2013.01); *F05D 2220/32* (2013.01); *F05D 2240/12* (2013.01); *F05D 2240/30* (2013.01); *F05D 2240/81* (2013.01); *F05D 2260/202* (2013.01); *F05D 2260/2214* (2013.01); *Y02T 50/676* (2013.01)

(58) Field of Classification Search
CPC .......... F01D 5/187; F01D 5/188; F01D 5/189; F01D 5/147; F01D 9/041; F01D 25/12; F01D 5/18; F16L 53/00; F05D 2220/32; F05D 2240/12; F05D 2240/30; F05D 2240/81; F05D 2260/202; F05D 2260/2214; Y02T 50/676
USPC ........................................................ 415/115
See application file for complete search history.

(56) References Cited

U.S. PATENT DOCUMENTS

| | | |
|---|---|---|
| 3,966,357 A | 6/1976 | Corsmeier |
| 4,474,532 A | 10/1984 | Pazder |

(Continued)

FOREIGN PATENT DOCUMENTS

| | | |
|---|---|---|
| WO | 2014126674 | 8/2014 |
| WO | 2015023338 | 2/2015 |
| WO | 2015030926 | 3/2015 |

OTHER PUBLICATIONS

European Search Report for European Patent Application No. 16183718.2 completed Dec. 12, 2016.

*Primary Examiner* — Kenneth Bomberg
*Assistant Examiner* — Brian Delrue
(74) *Attorney, Agent, or Firm* — Carlson, Gaskey & Olds, P.C.

(57) ABSTRACT

An airfoil according to an example of the present disclosure includes, among other things, an airfoil body having an internal passage for conveying a fluid flow. The internal passage includes first and second passage sections coupled at a turn section. A baffle includes a body arranged in the second passage section to define two cooling flow paths, and a first wedge region extends from the body into the first passage section such that the fluid flow is directed through the turn section between the first passage section and the two cooling flow paths.

23 Claims, 5 Drawing Sheets

(56) References Cited

U.S. PATENT DOCUMENTS

| | | | | |
|---|---|---|---|---|
| 5,340,274 | A * | 8/1994 | Cunha | F01D 5/182 |
| | | | | 415/114 |
| 5,488,825 | A * | 2/1996 | Davis | F01D 5/187 |
| | | | | 415/115 |
| 6,193,465 | B1 | 2/2001 | Liotta et al. | |
| 6,382,908 | B1 * | 5/2002 | Keith | F01D 5/189 |
| | | | | 415/115 |
| 6,416,275 | B1 * | 7/2002 | Itzel | F01D 5/189 |
| | | | | 415/116 |
| 6,431,824 | B2 * | 8/2002 | Schotsch | F01D 9/02 |
| | | | | 374/145 |
| 6,450,759 | B1 * | 9/2002 | Miller | F01D 5/187 |
| | | | | 415/115 |
| 6,453,557 | B1 * | 9/2002 | Burdgick | F01D 5/189 |
| | | | | 29/889.7 |
| 6,468,031 | B1 * | 10/2002 | Yu | F01D 5/189 |
| | | | | 415/114 |
| 6,554,563 | B2 | 4/2003 | Noe et al. | |
| 6,742,984 | B1 * | 6/2004 | Itzel | F01D 5/189 |
| | | | | 29/889.722 |
| 6,939,102 | B2 | 9/2005 | Liang | |
| 7,118,325 | B2 * | 10/2006 | Kvasnak | F01D 5/005 |
| | | | | 415/115 |
| 7,137,784 | B2 | 11/2006 | Hall et al. | |
| 7,600,973 | B2 * | 10/2009 | Tibbott | F01D 5/187 |
| | | | | 416/189 |
| 8,109,724 | B2 | 2/2012 | Malecki et al. | |
| 8,152,468 | B2 | 4/2012 | Propheter-Hinckley et al. | |
| 9,328,618 | B2 * | 5/2016 | Grohens | F01D 5/189 |
| 9,458,767 | B2 * | 10/2016 | Farrell | F02C 7/22 |
| 2002/0085910 | A1 * | 7/2002 | Burdgick | F01D 5/188 |
| | | | | 415/116 |
| 2003/0031555 | A1 * | 2/2003 | Noe | F01D 5/189 |
| | | | | 415/115 |
| 2007/0048136 | A1 | 3/2007 | Boury et al. | |
| 2008/0317585 | A1 | 12/2008 | Lee et al. | |
| 2009/0246023 | A1 | 10/2009 | Chon et al. | |
| 2010/0054915 | A1 | 3/2010 | Devore et al. | |
| 2010/0124485 | A1 | 5/2010 | Tibbott | |
| 2012/0034100 | A1 | 2/2012 | Malecki et al. | |
| 2013/0052008 | A1 | 2/2013 | Spangler | |
| 2013/0223987 | A1 | 8/2013 | Stafford et al. | |
| 2015/0345397 | A1 * | 12/2015 | Bunker | F02C 7/18 |
| | | | | 416/95 |
| 2016/0076483 | A1 * | 3/2016 | Jasper | F01D 9/065 |
| | | | | 239/127.1 |
| 2017/0037732 | A1 * | 2/2017 | Spangler | F01D 5/187 |

* cited by examiner

LOW TURN LOSS BAFFLE FLOW DIVERTER

STATEMENT REGARDING FEDERALLY SPONSORED RESEARCH OR DEVELOPMENT

This invention was made with government support under Contract No. FA8650-09-D-2923-0021, awarded by the United States Air Force. The Government has certain rights in this invention.

BACKGROUND

This disclosure relates to cooling for a component of a gas turbine engine.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The blades and vanes are subject to extreme heat, and thus cooling schemes are utilized for each.

SUMMARY

An airfoil according to an example of the present disclosure includes an airfoil body having an internal passage for conveying a fluid flow. The internal passage includes first and second passage sections coupled at a turn section. A baffle includes a body arranged in the second passage section to define two cooling flow paths, and a first wedge region extends from the body into the first passage section such that the fluid flow is directed through the turn section between the first passage section and the two cooling flow paths.

In a further embodiment of any of the forgoing embodiments, an apex of the first wedge region is oriented in a direction towards an outer wall of the turn section.

In a further embodiment of any of the forgoing embodiments, the apex is arranged such that a division of the fluid flow into the two cooling flow paths at the apex is within a predetermined range.

In a further embodiment of any of the forgoing embodiments, the baffle is arranged in the internal passage such that a ratio of a volume of one of the two cooling flow paths and a volume of another one of the cooling flow paths in the turn section is within a predetermined range.

In a further embodiment of any of the forgoing embodiments, the first wedge region includes first and second sloped sides that are joined at an apex. The first sloped side defines a first reference plane intersecting surfaces of the turn section to define a first angle. The first angle is equal to or less than 45 degrees.

In a further embodiment of any of the forgoing embodiments, the body defines a hollow interior, and the baffle defines one or more openings configured to communicate coolant flow between the hollow interior and the internal passage.

In a further embodiment of any of the forgoing embodiments, the baffle is elongated, and a cross-section of the baffle taken transverse to a longitudinal direction of the baffle at the turn section has five to seven distinct sides.

In a further embodiment of any of the forgoing embodiments, the baffle includes a second wedge region sloping inwardly from the first wedge region towards the body such that the second wedge region is spaced from outer surfaces of the turn section.

In a further embodiment of any of the forgoing embodiments, the second wedge region abuts a terminal end of a rib separating the first and second passage sections, the rib defining a notch configured to receive a portion of the second wedge region such that the portion of the second wedge region is radially inboard of a radially outermost portion of the terminal end of the rib.

In a further embodiment of any of the forgoing embodiments, one of the two cooling flow paths is bounded by a pressure side of the airfoil body, and another one of the two cooling flow paths is bounded by a suction side of the airfoil body.

In a further embodiment of any of the forgoing embodiments, the airfoil body extends from a platform section, and the platform section defines a cavity configured to at least partially receive the baffle.

A baffle for an airfoil according to an example of the present disclosure includes an elongated body configured to be received in an internal passage of an airfoil, a first wedge region including surfaces sloping inwardly from opposed walls of the elongated body and joined at an apex, and a second wedge region including surfaces sloping inwardly from the first wedge towards the elongated body.

In a further embodiment of any of the forgoing embodiments, the apex is offset towards one of the opposed walls.

In a further embodiment of any of the forgoing embodiments, a cross-section of the baffle taken at one of the first wedge region and the second wedge region has five to seven distinct sides.

A gas turbine engine according to an example of the present disclosure includes a rotor spaced axially from a vane. At least one of the rotor and the vane includes an airfoil body. The airfoil body includes an internal passage for conveying a fluid flow. The internal passage includes first and second passage sections coupled at a turn section. A baffle includes a body arranged in the second passage section to define at least two cooling flow paths, and a first wedge region extends from the body into the first passage section such that the second passage section branches between the at least two cooling flow paths at a location adjacent to the turn section.

In a further embodiment of any of the forgoing embodiments, the first wedge region defines an apex arranged in the turn section such that a division of the fluid flow into each of the at least two cooling paths at the apex is within a predetermined range.

In a further embodiment of any of the forgoing embodiments, the apex slopes towards a rib of the airfoil body separating the first and second passage sections.

In a further embodiment of any of the forgoing embodiments, the airfoil body extends from a platform section, and an end portion of the baffle extends through the platform section.

In a further embodiment of any of the forgoing embodiments, the baffle includes a second wedge region extending from the body into the first passage section, the first wedge region slopes inwardly from opposed walls of the body, and the second wedge region slopes inwardly from the first wedge region towards the body such that the second wedge region is spaced apart from outer surfaces of the turn section.

In a further embodiment of any of the forgoing embodiments, the internal passage is a serpentine passage.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

DETAILED DESCRIPTION

Figure 1:
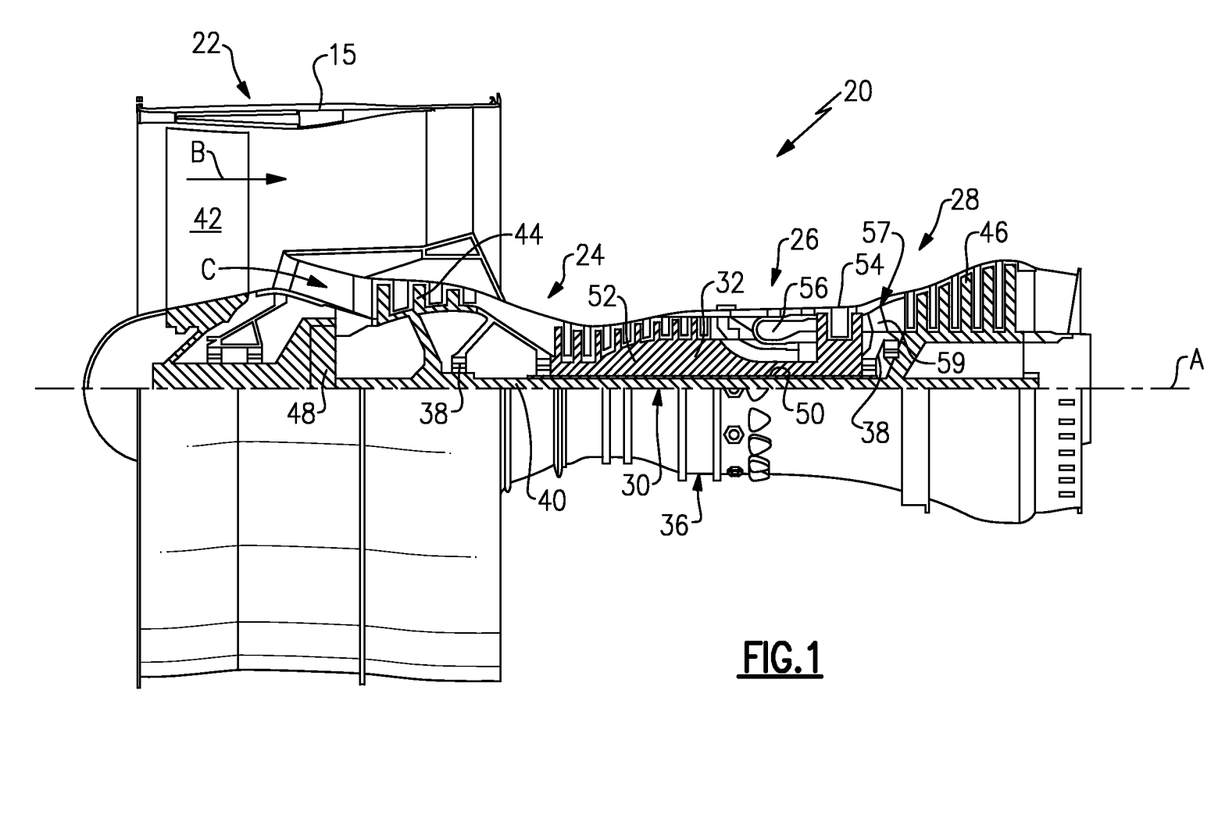
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The concepts described herein are not limited to use with turbofans and may be applied to other types of turbine engines, such as three-spool architectures. Alternative engines might also include an augmentor section (not shown) among other systems or features, or, may not include the fan section 22, such as in industrial gas turbine engines.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a second (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a first (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 2:
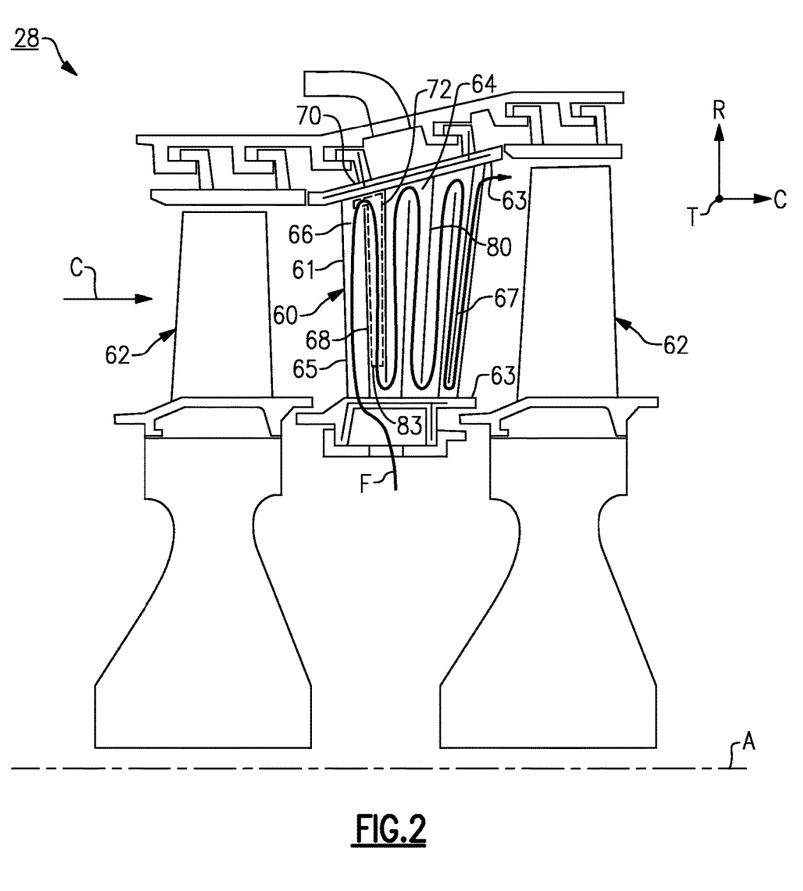
FIG. 2 schematically shows an airfoil arrangement for a turbine section.

FIG. 2 illustrates a portion of the turbine section 28/128, such as one of the high or low pressure turbines 46, 54, which includes an airfoil 60. In this disclosure, like reference numerals designate like elements where appropriate and reference numerals with the addition of one-hundred or multiples thereof designate modified elements that are understood to incorporate the same features and benefits of the corresponding original elements. In this example, the airfoil 60 is a vane that is situated between two rotatable blades 62. It is to be understood that although the examples herein are described with respect to the airfoil 60 as a vane, the examples are also applicable to rotatable blades (airfoils) or other airfoils in other sections of the engine 20, including other sections of the turbine section 28/128 or the compressor section 24/124.

The airfoil 60 includes an airfoil body 61 extending in a radial direction R between platforms 63. The airfoil body 61 extends in a chordwise direction C between a leading edge 65 and a trailing edge 67, and in a circumferential or thickness direction T between pressure and suction sides P, S (FIG. 3B). The airfoil body 61 has an internal passage 64 that serves to convey a fluid flow F through the airfoil 60. For example, the fluid flow F can be relatively cool air from the compressor section 24 or an upstream stage of the turbine section 28. Although not limited, the internal passage 64 in this example is a serpentine passage that winds radially back and forth within the airfoil body 61 with one or more ribs 80 separating the passage sections of the internal passage 64. In this regard, the internal passage 64 includes at least a first passage section 66 and a second passage section 68 separated by one of the ribs 80. A bend or turn section 70 connects the first and second passage sections 66, 68. The fluid flow F is thus conveyed through the internal passage 64 and is then discharged into the core flow path C through holes or openings in the airfoil body 61. Although the first and second passage sections 66, 68 are depicted as extending in the radial direction R, and the turn section 70 is depicted as turning approximately 180 degrees, it should be appreciated that the first and second passage sections 66, 68 and turn section 70 can be arranged at different orientations relative to each other and/or relative to the engine axis A to provide the desired cooling augmentation.

Figure 3A:
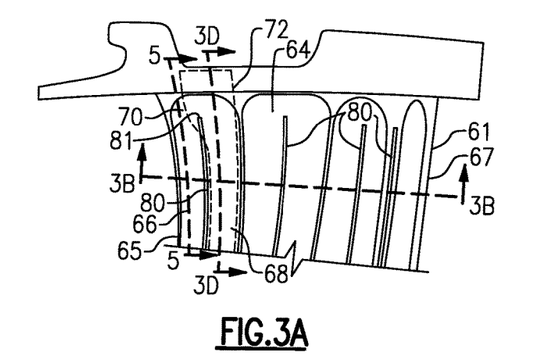
FIG. 3A illustrates a cross-sectional view of selected portions of the airfoil of FIG. 2.
Figure 3B:
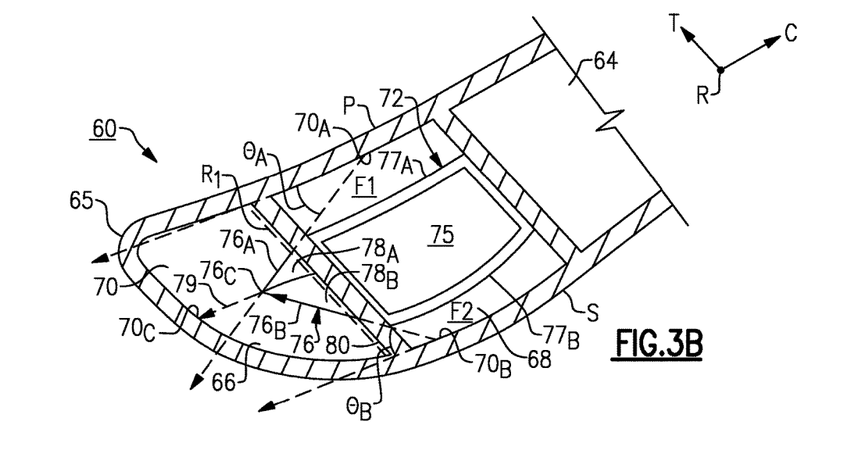
FIG. 3B illustrates a cross-sectional view of selected portions of the airfoil taken along line 3B-3B of FIG. 3A.
Figures 3C, 3D, 4B, 4C:
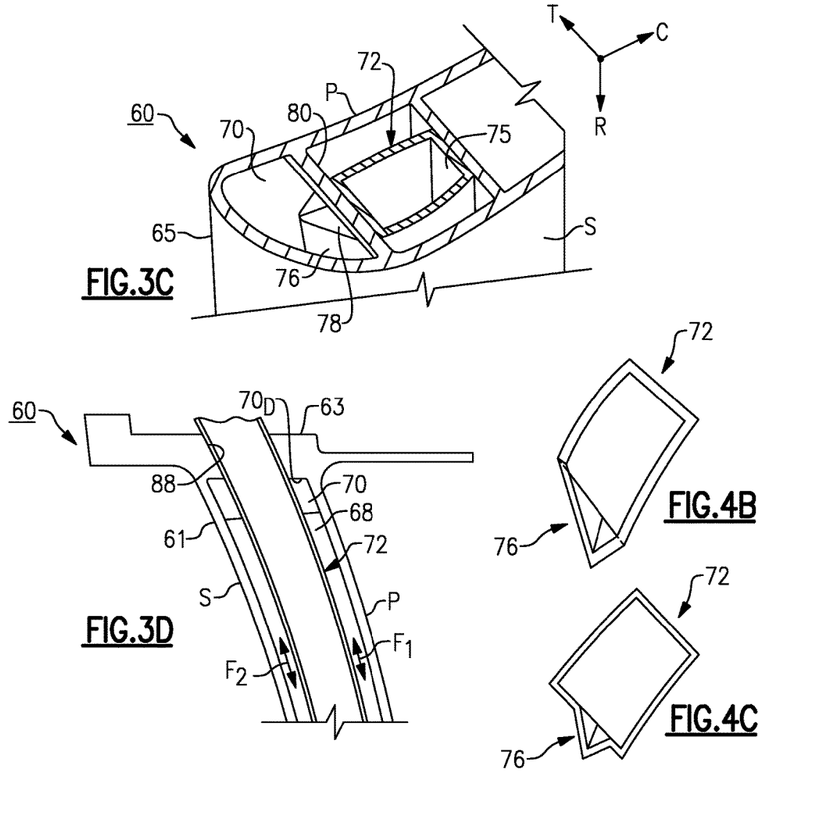
FIG. 3C illustrates a perspective view of the cross-section of FIG. 3B.
FIG. 3D illustrates a cross-sectional view of the airfoil taken along line 3D-3D of FIG. 3A.
FIG. 4B illustrates a cross-sectional view of the baffle taken along line 4B-4B of FIG. 4A.
FIG. 4C illustrates a cross-sectional view of the baffle taken along line 4C-4C of FIG. 4A.

Referring to FIGS. 3A-3D, a baffle 72 is situated in the internal passage 64 of the airfoil 60 to reduce an effective volume of the internal passage 64. FIG. 3A illustrates an axially-sectioned view of the airfoil 60. FIG. 3B illustrates a sectioned, radially outward view of the airfoil 60 taken along line 3B-3B. FIG. 3C illustrates a perspective view of the airfoil 60 of FIG. 3B in cross-section (with platform 63 omitted). FIG. 3D illustrates an axially-sectioned view of the airfoil 60 taken along line 3D-3D. Although the baffle 72 is situated adjacent to a leading edge 65 of the airfoil 60, it should be understood that the baffle 72 can be situated in other locations of the internal passage 64, such as in a passage section adjacent to a trailing edge 67 of the airfoil 60 or an intermediate passage section of the internal passage 64. The baffle 72 can be arranged to join or divide fluid flow F at radially inner portions of the internal passage 64 (FIGS. 3A-3D) and/or radially outer portions of the internal passage 64, for example.

In the illustrated example, the baffle 72 is situated in the second passage section 68 and the turn section 70. In some examples, the baffle 72 is fabricated of a metal or metal alloy, such as sheet metal, by additive manufacturing, by casting, or the like. The baffle 72 is configured to occupy a volume of the second passage section 68 to provide a desired cooling augmentation to portions of the airfoil body 61 adjacent to the baffle 72 or other heat loads.

The baffle 72 is arranged in the internal passage 64 to bound or otherwise define at least two cooling flow paths together with surfaces of the internal passage 64. In the illustrated example, the baffle 72 is arranged in the internal passage 64 to define two cooling flow paths F1, F2 (FIGS. 3B and 3D). The baffle 72 extends at least partially between the turn section 70 and the second passage section 68 such that the fluid flow F is directed through the turn section 70 between the first passage section 66 and the two cooling flow paths F1, F2. Accordingly, the baffle 72 is arranged in the internal passage 64 such that there is a radial and axial splitting of the fluid flow F in the two cooling flow paths F1, F2 with respect to the engine axis A (FIG. 2).

At least a portion of the baffle 72 is spaced from surfaces of the second passage section 68 such that one of the two cooling flow paths F1 is bounded by pressure side P of the airfoil body 61, and another one of the two cooling flow paths F2 is bounded by a suction side S of the airfoil body 61. In other examples, portions of baffle 72 extends in a circumferential direction to abut opposed surfaces of the second passage section 68, thereby defining a desired volume through the first and second flow paths F1, F2. The first and second flow paths F1, F2 are bounded by outermost surfaces 70D (FIG. 3D) of the turn section 70. The arrangements disclosed herein improve flow distribution through the turn section 70 by reducing flow separation of the first and second flow paths F1, F2 at the turn section 70.

Figure 4A:
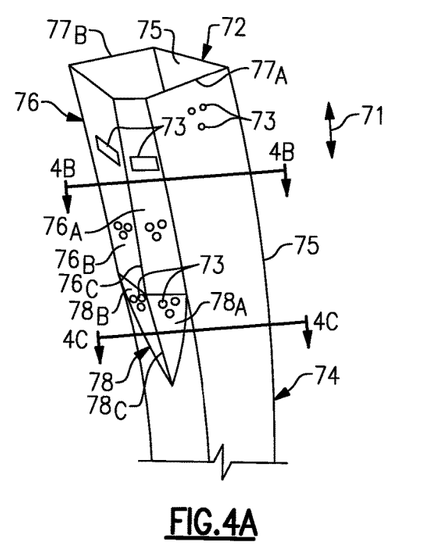
FIG. 4A illustrates a perspective view of a baffle.
Figure 5:
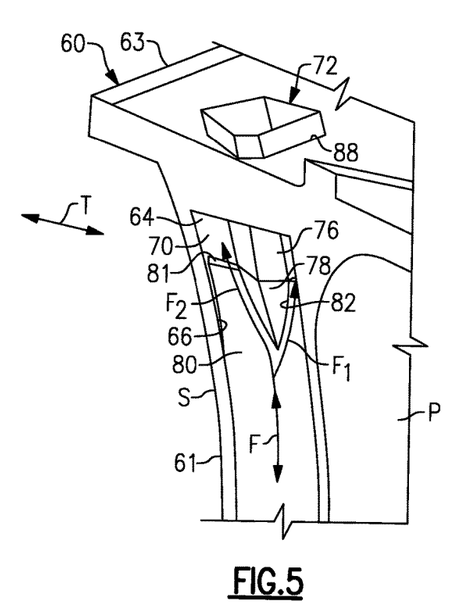
FIG. 5 illustrates a cross-sectional view of the airfoil taken along line 5-5 of FIG. 3A.

Referring to FIG. 4A, with continued reference to FIGS. 3A to 3D, an isolated view of the baffle 72 is shown. The baffle 72 includes a body 74 extending in a longitudinal direction 71, which can be parallel or substantially parallel to the radial direction R with respect to the engine axis A. The body 74 is elongated in the longitudinal direction 71 such that the body 74 occupies a desired volume of the second passage section 68. In the illustrated example, the first passage section 66 is free of the body 74 when the baffle 72 is located in an installed position (FIG. 5). In alternative examples, at least a portion of the body 74 extends into the first passage section 66.

In the illustrated example of FIG. 4A, the body 74 defines a hollow interior 75 for conveying a secondary fluid flow. The baffle 72 defines one or more cooling holes or openings 73 for discharging or otherwise conveying flow from the hollow interior 75 to selected portions of the internal passage 64, such as one of the cooling flow paths F1, F2 at the turn section 70, to provide a desired cooling augmentation through mixing of flow through the hollow interior 75 with the fluid flow F. The cooling holes 73 can be arranged such that flow is distributed in an axial and/or radial direction along external surfaces of the baffle 72 to reduce cooling air heat pickup and pressure loss. In some examples, a radially inner (or first) end portion 83 (FIG. 2) of the baffle 72 is configured to receive a portion of coolant flow from the second passage section 68 such that that the coolant flow is communicated through the hollow interior 75 and is discharged at the cooling holes 73 located at a radially outer (or second) end of the baffle 72. Utilizing this technique, the coolant flow from the hollow interior 75 of the baffle 72 is slowly diffused downstream at the turn section 70 and into the first passage section 66 to reduce downstream flow separation and pressure loss. In alternative examples, the hollow interior 75 is fluidly closed with respect to the internal passage 64 when the baffle 72 is located in an installed position (FIG. 5). Although a hollow interior 75 is depicted, in alternative examples a volume of the body 74 is occupied by material to provide a desired rigidity.

The baffle 72 includes a first wedge region 76 configured to be received in at least the turn section 70 of the internal passage 64. The first wedge region 76 includes a first sloped side 76A and a second sloped side 76B that slope inwardly from opposed walls 77A, 77B of the baffle 72 and are joined at an apex 76C. In the illustrated example, the apex 76C forms a defined edge. In other examples, the apex 76C is rounded to provide a smooth transition between the first passage section 66 and the turn section 70. The apex 76C is arranged in the internal passage 64 to divide and/or join the fluid flow F in the circumferential or thickness direction T between the first and second passage portions 66, 68 through the turn section 70.

When the baffle 72 is located in an installed position, the apex 76C is oriented in a direction 79 (FIG. 3B) transverse to the longitudinal direction 71 of the baffle 72 such that a projection of the apex 76C intersects an outer wall 70C of the turn section 70. In a further example, a length of the apex 76C is oriented in the longitudinal direction 71 such a projection of the apex 76C along the length intersects the platform 63. In the illustrated example, the apex 76C is offset towards wall 77A and away from opposed wall 77B. In alternative examples, the apex 76C is positioned substantially between the opposed walls 77A, 77B.

The baffle 72 includes a second wedge region 78 configured to be received in at least the turn section 70 of the internal passage 64. The second wedge region 78 includes a third sloped side 78A and a fourth sloped side 78B that slope inwardly from the first and second sloped sides 76A, 76B of the first wedge region 76 and towards the body 74. The sloped sides 78A, 78B are joined at an apex 78C. In the illustrated example, the apex 78C is substantially aligned in the longitudinal direction 71 with apex 76C of the first wedge portion 76, and slopes inwardly from an end of the apex 76C towards the body 74. The second wedge region 78 slopes inwardly from the first wedge region 76 towards the body 74 such that the second wedge region 78 is spaced from outer surfaces of the turn section 70 (shown in FIG. 5).

Each of the first and second wedge regions 76, 78 extends from the body 74 into the first passage section 66 such that the fluid flow F is directed through the turn section 70 between the first passage section 66 and the two cooling flow paths F1, F2. Thus, the first and second wedge regions 76, 78 extend through a reference plane $R_1$ (FIG. 3B) defined by the rib 80. When the fluid flow F is communicated in a first direction from the first passage section 66 to the first and section flow paths F1, F2, the second wedge region 78 serves to begin accelerating a velocity of the radial component of fluid flow F by gradually lowering an effective cross-sectional area of the turn section 70, while the first wedge region 76 gradually accelerates the axial component of fluid flow F in turn section 70. The incorporation of the second wedge region 78 allows the first wedge region 76 to extend farther into first passage section 66 and turn section 70 without disrupting the cooling flow and creating a relatively large pressure loss. The orientation and/or geometry of the first and second wedge regions 76, 78 can be selected to reduce pressure loss at an inlet to the turn section 70 and/or an exit of the turn section 70 for an accelerating or diffusing flow field condition.

A cross-section of the baffle 72 includes at least two distinct sides defined by wedge regions 76, 78 to divide and/or join flow through the turn section 70. For the purposes of this disclosure, adjacent distinct sides are defined by a corresponding inflection. Thus, the wedge regions 76, 78 can include distinct edges or can have contoured surfaces with no discrete edges. In the illustrated example, a cross-section of the baffle 72 taken transverse to a longitudinal direction 71 of the baffle 72 has five to seven distinct sides, such as five distinct sides at the first wedge region 76 (FIG. 4B) and seven distinct sides at the second wedge region 78 (FIG. 4C). Each of the cross-sections through the first and second wedge regions 76, 78 can be taken at the turn section 70 transverse to the reference plane $R_1$ (FIG. 3B) of rib 80 when the baffle 72 is located in an installed position.

Although the apexes 76C, 78C and other edges of the sloped sides 76A, 76B, 78A, 78B are depicted having sharp or otherwise distinct edges, it should be appreciated that the edges can be beveled, filleted or rounded, or otherwise contoured to reduce pressure loss and flow instability. In the illustrated example, the sloped sides 76A, 76B, 78A, 78B are planar or substantially planar. In alternative examples, at least some of the sloped sides 76A, 76B, 78A, 78B may comprise convex surfaces, concave surfaces, or be defined as more complex surfaces, consisting of multiple compound shapes having one or more inflection points. The arrangement of these geometric features (76A, 76B, 78A, and/or 78B) enables the tailoring of near wall and bulk coolant momentum and thermal boundary layer flow characteristics, velocity profiles and pressure gradients which directly affect local flow instability, pressure loss, and heat transfer performance.

Referring to FIG. 5, the fluid flow F can be communicated in a first direction in the internal passage 64 such that the first and second wedge regions 76, 78 branch or otherwise divide the fluid flow F from the first passage section 66 to the first and section flow paths F1, F2. In some examples, the first and second wedge regions 76, 78 are situated in the turn section 70 such that the fluid flow F is partially or fully diverted into (or entirely distributed between) the first and second flow paths F1, F2 (and around an exterior of the baffle 72) before entering the second passage section 68. In another example, the fluid flow F is communicated in a second, different direction such that the first and second wedge regions 76, 78 join the fluid flow F from the first and section flow paths F1, F2 to the first passage section 66. Regardless of the direction of fluid flow, the wedge regions 76, 78 are situated in the turn section 70 to provide a smooth or otherwise gradual transition to guide the fluid flow F1 through the turn section 70 between the first passage section 66 and first and section flow paths F1, F2. Accordingly, pressure loss through the turn section 70 caused by abrupt changes and flow separation in the flow path can be reduced. Additionally, vortices and other instabilities in the flow path during joining of the fluid flow can be reduced.

The baffle 72 is arranged in the turn section 70 such that a division of the fluid flow into or through the two cooling flow paths F1, F2 at the apex 76C, 78C is within a predetermined range. In one example, the baffle 72 is arranged in the internal passage 64 such that a ratio of a volume of one of the two cooling flow paths F1, F2 and a volume of another one of the cooling flow paths F1, F2 in the turn section 70 is within a predetermined range. The relative flow distribution can be tailored at the inlet and/or exit of the turn section 70, as well as through the turn section 70, based on the geometry distribution, surface contour, and relative location of the protrusion formed by sloped sides 76A, 76B, 78A, and 78B, and the apex 76C and 78C in passage 66. The first and second flow paths F1, F2 can be selected such that the fluid flow through each of the first and second flow paths F1, F2 is substantially equal, or can be selected to provide different cooling augmentation to portions of the airfoil 60 adjacent to the first and second flow paths F1, F2 such that the overall cooling demand and/or supply pressure can be reduced.

For example, apex 76C and/or 78C can be situated in the turn section 70 such that a projection of the apex 76C and/or 78C along the direction 79 generally bisects a cross-sectional area of the internal passage 64 at the turn section 70. In alternative examples, a projection of the apex 76C and/or 78C along the direction 79 can be such that a cross-sectional area of first and second flow paths F1, F2 at the turn section 70 differ. Utilizing this technique, an offset of apex 76C and/or apex 78C provides different distributions of the fluid flow F though the first and second flow paths F1, F2 depending on the desired relative cooling capacities.

In another example, the first sloped side 76A defines a reference plane intersecting localized surfaces 70A of the turn section 70 to define a first angle $\Theta_A$. Similarly, the second sloped side 76B defines a reference plane intersecting localized surfaces 70B of the turn section 70 to define a second angle $\Theta_B$. For the purposes of this disclosure, the reference plane corresponds to a geometry or profile of the corresponding sloped side, such as sloped sides 76A, 76B. The reference plane can be substantially planar, or can have a curved profile characterized by a rate of curvature of the corresponding sloped side, for example. The first and second angles $\Theta_A$, $\Theta_B$ can be taken at a tangent of the corresponding localized surfaces 70A, 70B of the turn section 70. In some examples, the first and/or second angles $\Theta_A$, $\Theta_B$ are equal to or less than 45 degrees, or more narrowly between 20 degrees and 35 degrees. In some examples, the first and/or second angles $\Theta_A$, $\Theta_B$ differ, and in other examples, the first and/or second angles $\Theta_A$, $\Theta_B$ are equal or substantially equal.

In some examples, the sloped sides 78A, 78B of the second wedge region 78 arranged in a similar manner, including any of the angles of the sloped sides 76A, 76B disclosed herein. Regardless of the particular shape and orientations, the sloped sides 76A, 76B, 78A, 78B can be acutely angled or positioned with respect to one another to gradually divert or join the fluid flow F through the turn section 70. In this manner, a volume of the fluid flow F communicated through each of the first and second flow paths F1, F2 in the turn section 70 is within a predetermined range.

Referring again to FIG. 5, the second wedge region 78 abuts a terminal end 81 of rib 80 separating the first and section passage sections 66, 68. In the illustrated example, the rib 80 defines a locating feature or notch 82 extending radially inwardly from the terminal end 81. The notch 82 has a geometry complementary to the second wedge region 78, such as generally V-shaped profile. The notch 82 is configured to receive a portion of the second wedge region 78 such that the portion of the second wedge region 78 is radially inboard of a radially outermost portion of the terminal end 81 of the rib 80. In this example, a portion of the second wedge region 78 extends a distance in the first passage section 66 radially inward of the turn section 70 bounded by a radially outermost portion of the terminal end 81 of rib 80. Thus, the notch 82 limits or otherwise reduces radial, axial and/or circumferential movement of the baffle 72 in the internal passage 64. The body 74 is configured to abut surfaces of the second passage section 68 and the rib 80 to reduce axial and/or circumferential movement of the baffle 72 (FIG. 3B).

In the illustrated example, the apex 78C slopes inwardly from an end of the apex 76C towards the rib 80 when the baffle 72 is located in an installed position. The second wedge region 78 is arranged relative to the body 74 and first wedge region 76 such that second wedge region 78 is spaced apart from outer surfaces of the turn section 70 when in the installed position.

The platform 63 defines a cavity 88 dimensioned to receive a portion of the baffle 72. An end of the baffle 72 extends radially outward from the turn section 70 of the internal passage 64. The cavity 88 can be configured to seal against or abut the baffle 72 such that the turn section 70 and radially outward portions of the platform 63 are fluidly isolated from each other. In alternative examples, the baffle 72 terminates radially inward from the platform 63 at the turn section 70.

Figure 6:
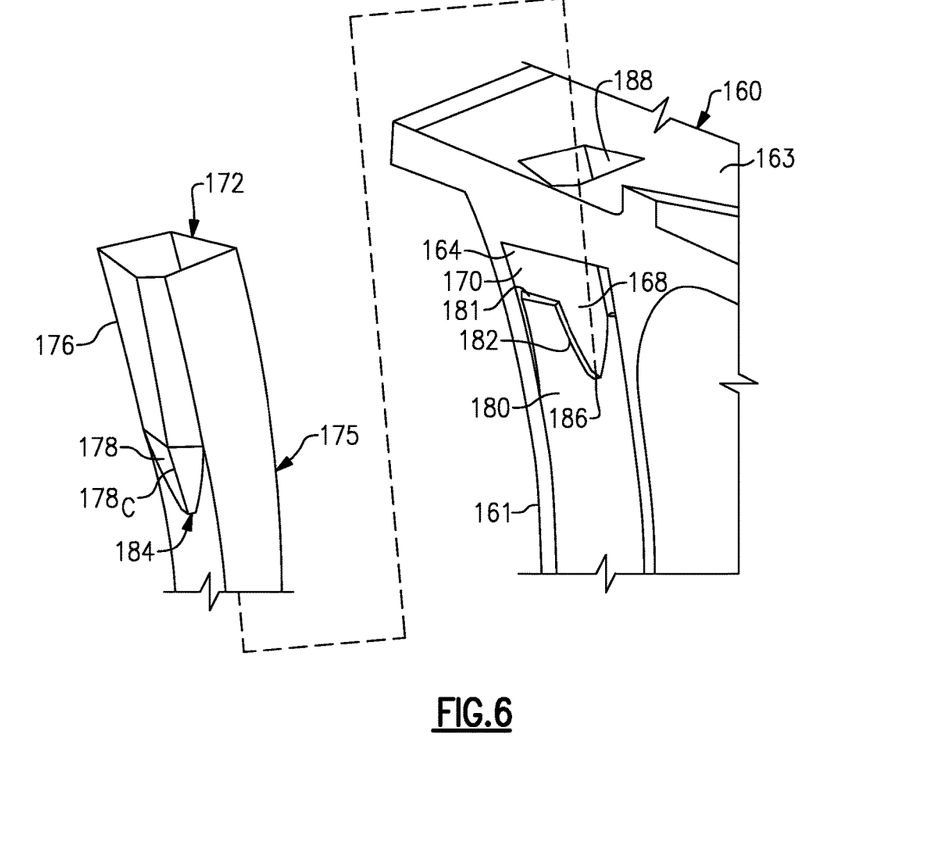
FIG. 6 illustrates an exploded view of a baffle and an airfoil according to a second embodiment.

FIG. 6 depicts an exploded view of an airfoil 160 and a baffle 172 according to a second embodiment. The baffle 172 defines a ledge 184 configured to abut a floor 186 of notch 182. The apex 178C terminates at the ledge 184. The floor 186 is configured to position the baffle 172 at a desired position radially in the second passage section 168 and turn section 170.

Referring to FIG. 5 (installed position) and FIG. 6 (uninstalled position), for installation, an end of the baffle 72/172 is moved from a radially outward direction to a radially inward direction into the cavity 88/188. The end of the baffle 72/172 is moved in the radially inward direction through the cavity 88/188 and into the second passage section 68/168 such that the second wedge region 178 abuts the notch 182. The baffle 72/172 can be welded or otherwise attached to surfaces of the internal passage 64/164, rib 80/180 and/or cavity 88/188 to secure the baffle 72/172 in the internal passage 64/164. In another example, the baffle 72/172 is situated in the internal passage 64/164 utilizing a casting or additive manufacturing technique.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil, comprising:
    an airfoil body having an internal passage for conveying a fluid flow, the internal passage including first and second passage sections coupled at a turn section; and
    a baffle including an elongated body arranged in the second passage section to define two cooling flow paths, and a first wedge region extending from the elongated body into the first passage section such that the fluid flow is directed through the turn section between the first passage section and the two cooling flow paths;

wherein the first wedge region includes first and second sloped sides having respective surfaces sloping inwardly from opposed walls of the elongated body and joined at an apex; and wherein the baffle includes a second wedge region having surfaces sloping inwardly from the first wedge region towards the elongated body.

2. The airfoil as recited in claim 1, wherein the apex of the first wedge region is oriented in a direction towards an outer wall of the turn section.

3. The airfoil as recited in claim 2, wherein the apex is arranged such that a division of the fluid flow into the two cooling flow paths at the apex is within a predetermined range.

4. The airfoil as recited in claim 2, wherein the baffle is arranged in the internal passage such that a ratio of a volume of one of the two cooling flow paths and a volume of another one of the cooling flow paths in the turn section is within a predetermined range.

5. The airfoil as recited in claim 1, wherein the first sloped side defining a first reference plane intersecting surfaces of the turn section to define a first angle, the first angle being equal to or less than 45 degrees.

6. The airfoil as recited in claim 1, wherein the elongated body defines a hollow interior, and the baffle defines one or more openings configured to communicate coolant flow between the hollow interior and the internal passage.

7. The airfoil as recited in claim 1, wherein a cross-section of the baffle taken transverse to a longitudinal direction of the baffle at the turn section has five to seven distinct sides.

8. The airfoil as recited in claim 1, wherein the second wedge region is spaced from outer surfaces of the turn section.

9. The airfoil as recited in claim 8, wherein the second wedge region abuts a terminal end of a rib separating the first and second passage sections, the rib defining a notch configured to receive a portion of the second wedge region such that the portion of the second wedge region is radially inboard of a radially outermost portion of the terminal end of the rib.

10. The airfoil as recited in claim 1, wherein one of the two cooling flow paths is bounded by a pressure side of the airfoil body, and another one of the two cooling flow paths is bounded by a suction side of the airfoil body.

11. The airfoil as recited in claim 1, wherein the airfoil body extends from a platform section, and the platform section defines a cavity configured to at least partially receive the baffle.

12. A baffle for an airfoil, comprising:
an elongated body configured to be received in an internal passage of an airfoil;
a first wedge region including surfaces sloping inwardly from opposed walls of the elongated body and joined at an apex; and
a second wedge region including surfaces sloping inwardly from the first wedge towards the elongated body.

13. The baffle as recited in claim 12, wherein the apex is offset towards one of the opposed walls.

14. The baffle as recited in claim 12, wherein a cross-section of the baffle taken at one of the first wedge region and the second wedge region has five to seven distinct sides.

15. A gas turbine engine, comprising:
a rotor spaced axially from a vane; and
wherein at least one of the rotor and the vane includes an airfoil body, the airfoil body comprising:
an internal passage for conveying a fluid flow, the internal passage including first and second passage sections coupled at a turn section;
a baffle including an elongated body arranged in the second passage section to define at least two cooling flow paths, and a first wedge region extending from the elongated body into the first passage section such that the second passage section branches between the at least two cooling flow paths at a location adjacent to the turn section;
wherein the first wedge region includes first and second sloped sides having respective surfaces sloping inwardly from opposed walls of the elongated body and joined at an apex; and
wherein the baffle includes a second wedge region having surfaces sloping inwardly from the first wedge region towards the elongated body.

16. The gas turbine engine as recited in claim 15, wherein the apex is arranged in the turn section such that a division of the fluid flow into each of the at least two cooling paths at the apex is within a predetermined range.

17. The gas turbine engine as recited in claim 16, wherein the apex slopes towards a rib of the airfoil body separating the first and second passage sections.

18. The gas turbine engine as recited in claim 16, wherein the airfoil body extends from a platform section, and an end portion of the baffle extends through the platform section.

19. The gas turbine engine as recited in claim 15, wherein the second wedge region extends from the elongated body into the first passage section, and the second wedge region is spaced apart from outer surfaces of the turn section.

20. The gas turbine engine as recited in claim 15, wherein the internal passage is a serpentine passage.

21. The airfoil as recited in claim 9, wherein:
the elongated body abuts the rib;
each of the two cooling flow paths extend along a length of opposed ends of the baffle and are bounded by walls of the rib; and
the second wedge region is spaced from outer surfaces of the turn section.

22. The gas turbine engine as recited in claim 17, wherein the elongated body defines a hollow interior, the baffle defines one or more openings configured to communicate coolant flow between the hollow interior and the at least two cooling flow paths, one of the at least two cooling flow paths is bounded by a pressure side of the airfoil body, and another one of the at least two cooling flow paths is bounded by a suction side of the airfoil body.

23. The gas turbine engine as recited in claim 22, wherein the airfoil body extends from a platform section, the rib separates the first and second passage sections and bounds the turn section, and the elongated body is arranged in the second passage section to abut the rib such that each of the at least two cooling flow paths extend along the length of opposed ends of the baffle and are bounded by walls of the rib.

* * * * *